US008787644B2

(12) United States Patent
Ye et al.

(10) Patent No.: US 8,787,644 B2
(45) Date of Patent: Jul. 22, 2014

(54) METHOD AND DEVICE FOR CALCULATING VOXELS DEFINING A TUBE-OF-RESPONSE USING A CENTRAL-RAY-FILLING ALGORITHM

(75) Inventors: Hongwei Ye, Kenosha, WI (US); Wenli Wang, Briarcliff Manor, NY (US)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 54 days.

(21) Appl. No.: 13/160,145

(22) Filed: Jun. 14, 2011

(65) Prior Publication Data

US 2012/0321158 A1    Dec. 20, 2012

(51) Int. Cl.
*G06K 9/00* (2006.01)
(52) U.S. Cl.
USPC .......................................... 382/131; 382/128
(58) Field of Classification Search
None
See application file for complete search history.

(56) References Cited

U.S. PATENT DOCUMENTS

| 8,080,799 | B2 | 12/2011 | Scheins | |
|---|---|---|---|---|
| 2006/0182327 | A1* | 8/2006 | Mundy et al. | 382/132 |
| 2007/0242867 | A1* | 10/2007 | Jan et al. | 382/131 |
| 2008/0180580 | A1 | 7/2008 | Kadrmas | |
| 2008/0217540 | A1* | 9/2008 | Panin et al. | 250/363.03 |
| 2008/0219525 | A1* | 9/2008 | Panin et al. | 382/128 |
| 2009/0041323 | A1* | 2/2009 | Lachaine et al. | 382/131 |
| 2009/0202036 | A1* | 8/2009 | Ziegler et al. | 378/19 |
| 2010/0074500 | A1* | 3/2010 | Defrise et al. | 382/131 |
| 2010/0098312 | A1* | 4/2010 | Leahy et al. | 382/131 |
| 2010/0284600 | A1 | 11/2010 | Yamada | |
| 2011/0182491 | A1* | 7/2011 | Levin et al. | 382/131 |
| 2013/0066589 | A1* | 3/2013 | Ye et al. | 702/158 |

FOREIGN PATENT DOCUMENTS

| JP | 63-85479 A | 4/1988 |
|---|---|---|
| JP | 2010-266235 A | 11/2010 |
| JP | 2011-501200 A | 1/2011 |
| WO | WO 2009/093305 A1 | 7/2009 |

OTHER PUBLICATIONS

Schretter, C., A fast tube of response ray-tracer, 2006, American Association of Physicists in Medicine, vol. 33, No. 12, pp. 4744-4748.*

Rehfeld, N.S., Monte Carlo Simulations in Positron Emission Tomography Reconstruction, 2007, Doctoral dissertation, University of Tübingen.*

(Continued)

*Primary Examiner* — Stephen R Koziol
*Assistant Examiner* — Jonathan S Lee
(74) *Attorney, Agent, or Firm* — Oblon, Spivak, McClelland, Maier & Neustadt, L.L.P.

(57) ABSTRACT

A method and device for calculating voxels defining a tube-of-response (TOR) within a reconstruction space of a Positron Emission Tomography (PET) apparatus having a plurality of crystals, the voxels within the reconstruction space having a predetermined size. The method includes selecting a center on each of two crystals defining a line of response, determining intersected voxels within the reconstruction space that intersect a straight line connecting the centers of the two crystals, calculating neighboring voxels of the intersected voxels, based on an expansion direction and an expansion distance, merging the intersected voxels and the neighboring voxels to form a merged set of voxels, and deleting duplicate voxels in the merged set of voxels to generate the voxels defining the TOR.

20 Claims, 17 Drawing Sheets

(56) References Cited

OTHER PUBLICATIONS

Qi et al., High-resolution 3D Bayesian image reconstruction using the microPET small-animal scanner, 1998, Phys. Med. Biol., vol. 43, pp. 1001-1013.*

Takahashi et al., System Modeling of Small Bore DOI-PET Scanners for Fast and Accurate 3D Image Reconstruction, 2007, IEEE Nuclear Science Symposium Conference Record, vol. 5, pp. 3478-3481.*

Chen, P. and He, Y., IRVR Algorithm: A New Volume Rendering Accelerating Method Based on Image Recognition, 2008, International Conference on BioMedical Engineering and Informatics, vol. 2, pp. 102-106.*

Pratx, G., Chinn, G., Habte, F., Olcott, P., and Levin, C., Fully 3-D List-Mode OSEM Accelerated by Graphics Processing Units, 2006, IEEE Nuclear Science Symposium Conference Record, vol. 47, pp. 2196-2202.*

Egger, M.L., Joseph, C., and Morel, C., Incremental beamwise backprojection using geometrical symmetries for 3D PET reconstruction in a cylindrical scanner geometry, 1998, Phys. Med. Biol., vol. 43, pp. 3009-3024.*

Popescu, L.M. and Lewitt, R.M., Ray tracing through a grid of blobs, 2004, Nuclear Science Symposium Conference Record, vol. 6, pp. 3983-3986.*

Böning, G. Pichler, B.J., and Rafecas, M., and Lorenz, E., Schwaiger, M., and Ziegler, S.I., Implementation of Monte Carlo Coincident Aperture Functions in Image Generation of a High-Resolution Animal Positron Tomograph, 2001, IEEE Transactions on Nuclear Science, vol. 48, No. 3, pp. 805-810.*

Pratz, G. and Levin, C., Online detector response calculations for high-resolution PET image reconstruction, 2011, Phys. Med. Biol., vol. 56, pp. 4023-4040.*

Kazantsev, I.G., Matej, S., and Lewitt, R.M., System and Gram Matrices of 3-D Planogram Data, 2004, IEEE Transactions on Nuclear Science, vol. 51, No. 5, pp. 2579-2587.*

Yamaya, T., Hagiwara, N., Obi, T., Yamaguchi, M., Ohyama, N., Kitamura, K., Hasegawa, T., Haneishi, H., Yoshida, E., Inadama, N., and Murayama, H., Transaxial system models for jPET-D4 image reconstruction, 2005, Phys. Med. Biol., vol. 50, pp. 5339-5355.*

Shakirin, G., Crespo, P., and Enghardt, W., A Method for System Matrix Construction and Processing for Reconstruction of In-Beam PET Data, 2007, IEEE Transactions on Nuclear Science, vol. 54, No. 5, pp. 1710-1716.*

Aguiar, P., Rafecas, M., Ortuno, J.E., Kontaxakis, G., Santos, A., Pavia, J., and Ros, D., Geometrical and Monte Carlo projectors in 3D PET reconstruction, 2010, Med. Phys., vol. 37, No. 11, pp. 5691-5702.*

Ortuno, J.E., Kontaxakis, G., Rubio, J.L., Guerra, P., and Santos, A., Efficient methodologies for system matrix modelling in iterative image reconstruction for rotating high-resolution PET, Physics in Medicine and Biology, vol. 55, pp. 1833-1861.*

International Search Report issued Jul. 17, 2012 in PCT/JP2012/065160.

J.L. Herraiz, et al., "Statistical Reconstruction Methods in PET: Resolution Limit, Noise, Edge Artifacts and considerations for the design of better scanners", IEEE Nuclear Science Symposium Conference Record, vol. 4, 2005, pp. 1846-1850.

Robert L. Siddon, "Fast calculation of the exact radiological path for a three-dimensional CT array", Medical Physics, Mar./Apr. 1985, vol. 12, No. 2, pp. 252-255.

* cited by examiner

METHOD AND DEVICE FOR CALCULATING VOXELS DEFINING A TUBE-OF-RESPONSE USING A CENTRAL-RAY-FILLING ALGORITHM

BACKGROUND

1. Field

Embodiments described herein relate to detecting intersections of a tube-of-response and a reconstruction space in positron emission tomography.

2. Background

The use of positron emission tomography (PET) is growing in the field of medical imaging. In PET imaging, a radiopharmaceutical agent is introduced into an object to be imaged 15, shown in FIG. 1, via injection, inhalation, or ingestion. After administration of the radiopharmaceutical, the physical and bio-molecular properties of the agent will cause the agent to concentrate at specific locations in the human body (i.e., object 15). The actual spatial distribution of the agent, the intensity of the region of accumulation of the agent, and the kinetics of the process from administration to eventually elimination are all factors that may have clinical significance. During this process, a positron emitter attached to the radiopharmaceutical agent will emit positrons according to the physical properties of the isotope, such as half-life, branching ratio, etc.

The radionuclide emits positrons, and when an emitted positron collides with an electron, an annihilation event occurs, wherein the positron and electron are destroyed. Most of the time, an annihilation event produces two gamma rays at 511 keV traveling at substantially 180 degrees apart.

By detecting the two gamma rays, and drawing a line between their locations, i.e., the line-of-response (LOR), one can retrieve the likely location of the original disintegration. While this process will only identify a line of possible interaction, by accumulating a large number of those lines, and through a tomographic reconstruction process, the original distribution can be estimated. In addition to the location of the two scintillation events, if accurate timing (within few hundred picoseconds) is available, a time-of-flight (TOF) calculation can add more information regarding the likely position of the event along the line. Limitations in the timing resolution of the scanner will determine the accuracy of the positioning along this line. Limitations in the determination of the location of the original scintillation events will determine the ultimate spatial resolution of the scanner, while the specific characteristics of the isotope (e.g., energy of the positron) will also contribute (via positron range and co-linearity of the two gamma rays) to the determination of the spatial resolution the specific agent.

The collection of a large number of events creates the necessary information for an image of an object to be estimated through tomographic reconstruction. Two detected events occurring at substantially the same time at corresponding detector elements form a line-of-response that can be histogrammed according to their geometric attributes to define projections, or sinograms, to be reconstructed. Events can also be added to the image individually.

The fundamental element of the data collection and image reconstruction is therefore the LOR, which is the line traversing the system-patient aperture. Additional information can be obtained regarding the location of the event. First, it is known that, through sampling and reconstruction, the ability of the system to reconstruct or position a point is not space-invariant across the field of view, but is better in the center, slowly degrading toward the periphery. A point-spread-function (PSF) is typically used to characterize this behavior. Tools have been developed to incorporate the PSF into the reconstruction process. Second, the time-of-flight, or time differential between the arrival of the gamma ray on each detector involved in the detection of the pair, can be used to determine where along the LOR the event is more likely to have occurred.

The above described detection process must be repeated for a large number of annihilation events. While each imaging case must be analyzed to determine how many counts (i.e., paired events) are required to support the imaging task, current practice dictates that a typical 100-cm long, FDG (fluoro-deoxyglucose) study will need to accumulate several hundred million counts. The time required to accumulate this number of counts is determined by the injected dose of the agent and the sensitivity and counting capacity of the scanner.

While a PET detector can only detect single interactions, i.e., one gamma ray interacting with a crystal and generating light through a scintillation process, PET events are defined by two of those detections occurring at substantially the same time or in coincidence, at substantially 511 keV, and in a geometry compatible with the annihilation event to have occurred in an object of interest 15. It is therefore required for a PET system to properly identify the timeline for each event in order to correctly match or pair events. This is typically accomplished by constructing a complex network of real-time comparators. As the requirement for count rate is also very demanding (up to hundreds of millions of single events per second), the construction of the coincidence circuitry also needs to handle a very large numbers of counts.

Because of the high demand on efficiency, i.e., being able to receive and process hundreds of millions of events per second, the design of the coincidence circuitry is typically one of the most important elements of the PET detection system. Trigger lines are typically brought to centralized hardware for comparison. Usually the coincidence window, or the period of time within which two events will be deemed to be "at the same time," is set from high-level system controls and does not typically vary during a study or even between studies.

In summary, in PET imaging, a certain kind of radiopharmaceutical with a radioactive isotope (e.g., F-18) is injected into a patient or an object 15. The isotope has an unstable nucleus that undergoes one or several transitions and emits positrons. One positron can annihilate with an electron and produce two 511-keV photons that are emitted in the opposite direction of almost 180 degrees. The aforementioned photons are then captured by a pair of crystals 10 (i.e., scintillation crystals such as LYSO) in a PET ring 20 and recorded by electric circuits, as is illustrated in FIG. 1.

The PET reconstruction process finds the amount and the location of isotopes (unknown) in the patient from the data recorded in the PET system (known). The basic question in the PET reconstruction process is which locations (represented by voxels in the reconstruction space) contribute to a given pair of crystals 10.

To address this question, a certain algorithm is designed to calculate intersections of a line-of-response (LOR) or tube-of-response (TOR, which is a polyhedron formed by connecting corresponding corners of a pair of crystals 10) and a reconstruction space. The aforementioned intersections (i.e., voxels) contributing to a particular pair of crystals 10 (partially or completely) are calculated and updated using a reconstruction algorithm. FIG. 2A shows a three-dimensional (3D) illustration of tube-of response 30 formed by connecting four (4) corners of each crystal 10. FIG. 2B shows intersected voxels 55 of tube-of-response 30 and the reconstruction space 50 (represented by voxels) in a two-dimensional (2D) view.

A conventional formula used in the iterative Ordered Subset Expectation Maximization (OSEM) reconstruction is shown in Equation 1:

$$\overline{f}_j^{k+1} = \frac{\overline{f}_j^k}{Q_j} \sum_{i \in Sub_t} \frac{a_{ij} Y_i}{\sum_{j'=1}^{m} a_{ij'} \overline{f}_{j'}^k + R_i + S_i}$$

In Equation 1, $a_{ij}$ is the probability of voxel j contributing to the $TOR_i$, $Q_j$ is the normalization term, $f_j$ is the activity of voxel j, $Y_i$ is the detected photons in $TOR_i$, $Sub_t$ is the $t^{th}$ subset, and $R_i$ and $S_i$ are random and scatter counts along $TOR_i$, respectively. In Equation 1, j's (from 1 to m) represent the intersected voxels that have to be found.

The quantitative PET reconstruction requires the system response matrix to be as accurate as possible. Thus, a basic requirement is to accurately find all voxels that can contribute to a given pair of crystals 10. In the clinic, the speed of reconstruction is also very important. Therefore, a fast and accurate algorithm is needed to meet this requirement.

BRIEF DESCRIPTION OF THE DRAWINGS

The disclosure will be better understood from reading the description which follows and from examining the accompanying figures. These are provided solely as non-limiting examples of embodiments. In the drawings.

DETAILED DESCRIPTION

Figure 1:
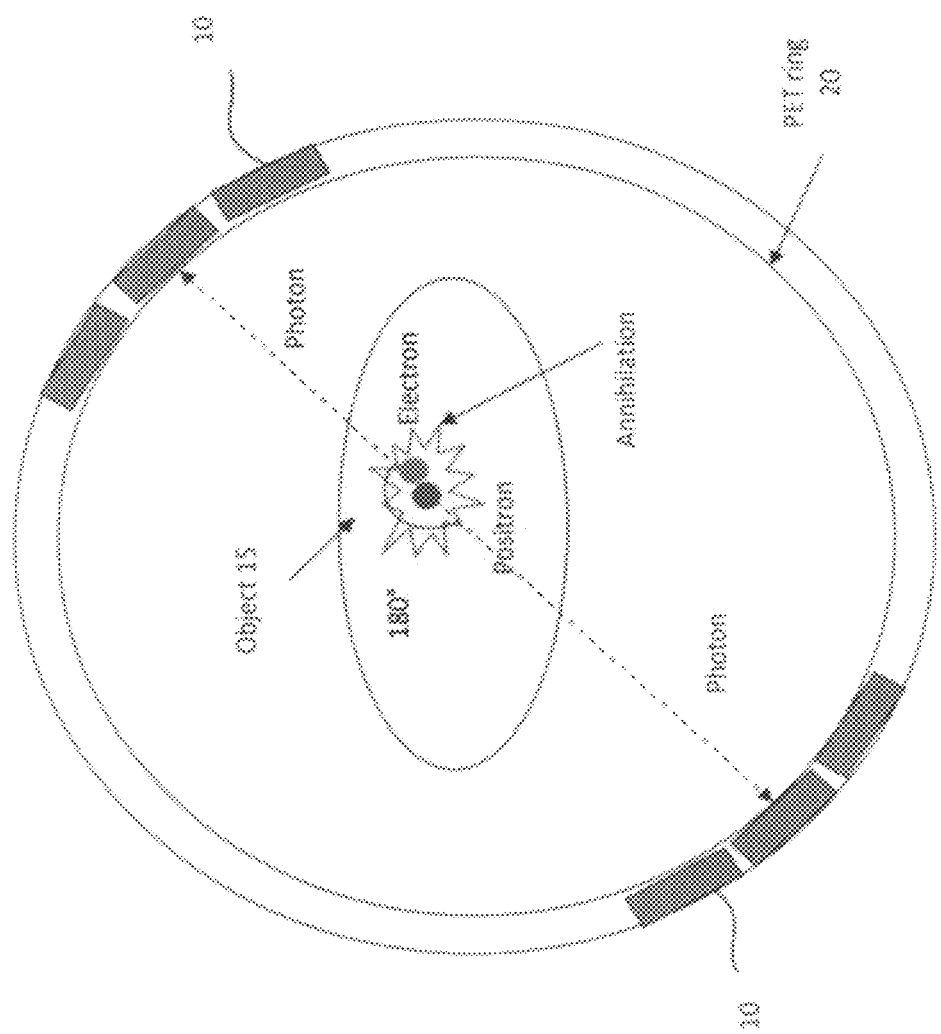
FIG. 1 shows a Positron Emission Tomography (PET) ring.
Figure 2B:
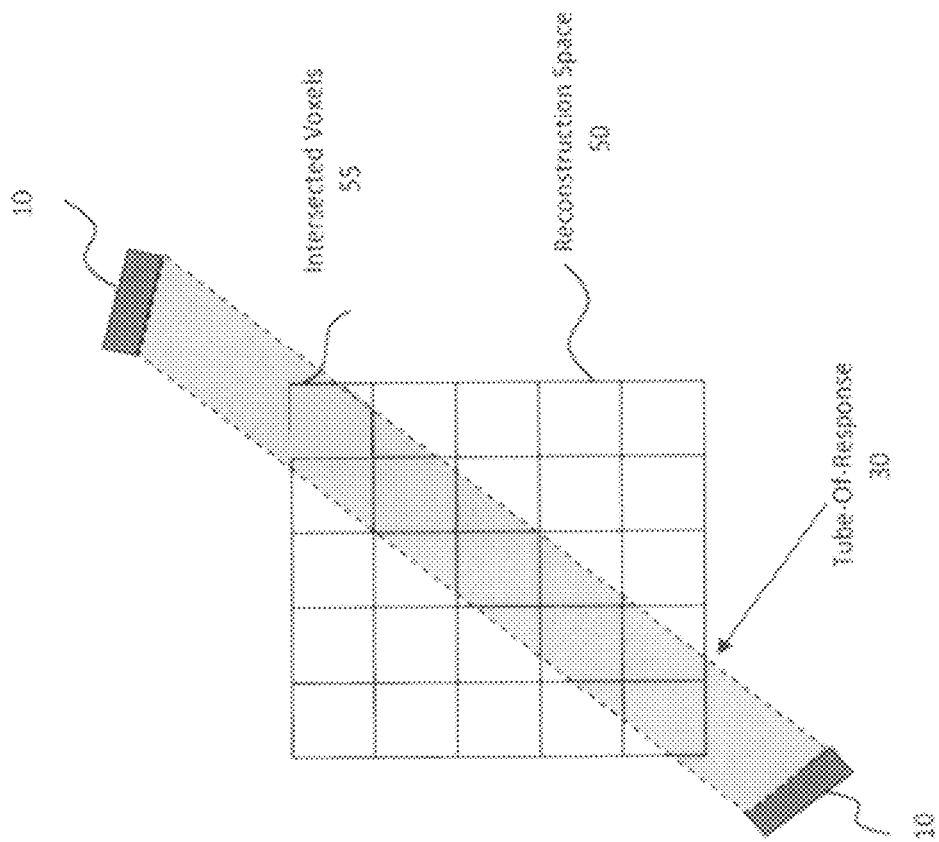
FIGS. 2A and 2B show a tube-of-response, intersected voxels of the tube-of-response, and a reconstruction space.
Figure 2A:
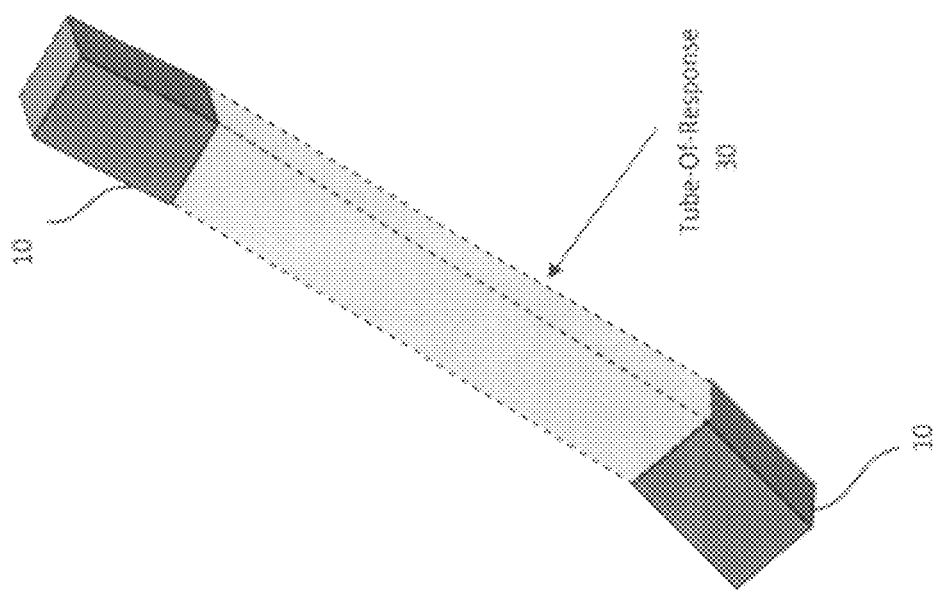

The present disclosure describes a method and device for calculating voxels defining a tube-of-response (TOR) within a reconstruction space of a Positron Emission Tomography (PET) apparatus having a plurality of crystals, the voxels within the reconstruction space having a predetermined size. The method includes selecting a center on each of two crystals defining a line of response, determining intersected voxels within the reconstruction space that intersect a straight line connecting the centers of the two crystals, calculating neighboring voxels of the intersected voxels, based on an expansion direction and an expansion distance, merging the intersected voxels and the neighboring voxels to form a merged set of voxels, and deleting duplicate voxels in the merged set of voxels to generate the voxels defining the TOR.

The method of the present disclosure further includes determining the expansion direction based on a location of the two crystals and geometric properties of the PET apparatus, and determining the expansion distance based on the size of the two crystals, the predetermined size of the voxels within the reconstruction space, and a tilted angle of lines connecting endpoints of the two crystals, and calculating the expansion distance, the expansion distance being equal to half a size of a length of the two crystals projected onto an X-axis of the PET apparatus, when lines connecting endpoints of the two crystals are parallel to each other.

In addition, the method includes calculating a left expansion distance and a right expansion distance, the left expansion distance corresponding to a left side of the two crystals projected onto a coordinate axis of the PET apparatus and being different from the right expansion distance corresponding to a right side of the two crystals projected onto the X-axis, when lines connecting endpoints of the two crystals are not parallel to each other, calculating an upper expansion distance and a lower expansion distance, the upper expansion distance corresponding to an upper side of the two crystals projected onto a Y-axis of the PET apparatus and being different from the lower expansion distance corresponding to a lower side of the two crystals projected onto the Y-axis, when lines connecting endpoints of the two crystals are not parallel to each other, and calculating a first Z expansion distance in a negative Z direction along a Z-axis and a second Z expansion distance in a positive Z direction along the Z-axis, based on a distance between a first line connecting two endpoints of a first side of the two crystals projected onto the Z-axis of the PET apparatus, and a second line connecting two endpoints of a second side of the two crystals projected onto the Z-axis, the first line and the second line being located farthest from each other.

The method of the present disclosure further includes calculating the neighboring voxels in an X-Y plane and in a Y-Z/X-Z plane of the PET apparatus, and skipping intersections of the intersected voxels based on boundaries of the intersected voxels in an X-Y plane and in a Y-Z/X-Z plane of the PET apparatus.

A ray-tracing algorithm (e.g., Siddon's algorithm) may be used to find all intersected voxels inside the TOR 30. The ray-tracing algorithm selects one point in each crystal 10 for a TOR 30, then connects two points by a straight line (i.e., a ray), and finally computes the intersected voxels 55 of this ray within the reconstruction space 50. The selected point on each crystal 10 is the central point of each crystal 10.

Figure 3B:
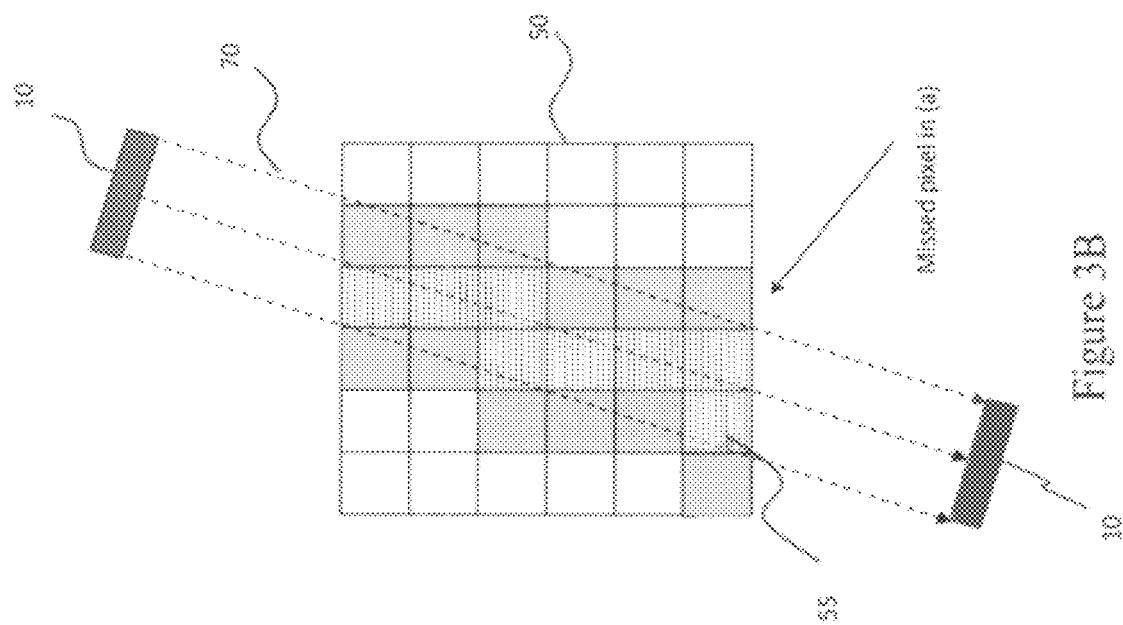
FIGS. 3A and 3B illustrate the ray-tracing algorithm.
Figure 3A:
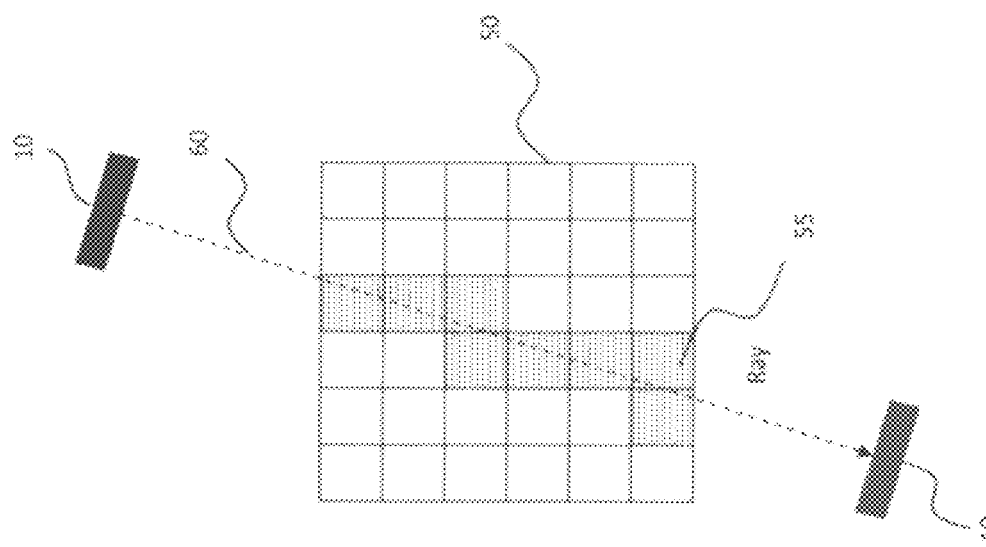

Depending on the relative size of crystals and voxels, in order to trace all intersected voxels 55 in a particular TOR 30, a plurality of rays are used in most cases. For example, nine (9) rays may be used when the crystal is two times bigger than the voxel. This approach may take a lot of computational time, especially when the crystal is much larger than the voxel. Therefore, the reconstruction process may become slow in this situation. FIGS. 3A and 3B show a 2D case of the crystal being twice as big as the voxel. If only one central ray 60 is used in the calculations, many voxels contributing to the TOR are missed, as is shown in FIG. 3A. Thus, in order to cover all intersected voxels 55, three (3) rays 70 in 2D, as is shown in FIG. 3B, or nine (9) rays (not shown) in 3D are needed when using the ray-tracing algorithm to find the intersected voxels 55.

As discussed above, in the ray-tracing algorithm, multiple rays 70 are required to cover all intersected voxels 55. The number of rays depends on the relative size between the crystal 10 and the voxel, and may be calculated as follows, using Equation 2:

$$N = (\lceil r \rceil + 1)^2$$

In Equation 2, N is the number of rays and r is the size ratio between the crystal 10 and the voxel.

According to an embodiment of the present disclosure, a central-ray-filling algorithm (CRF) may be used to calculate intersections of a TOR 30 and the reconstruction space 50. The CRF algorithm applies the ray-tracing calculation for the central ray 60, then expands the calculation to the entire TOR 30 in the X-Y and Y-Z/X-Z planes, and collects all intersected voxels.

Figure 4:
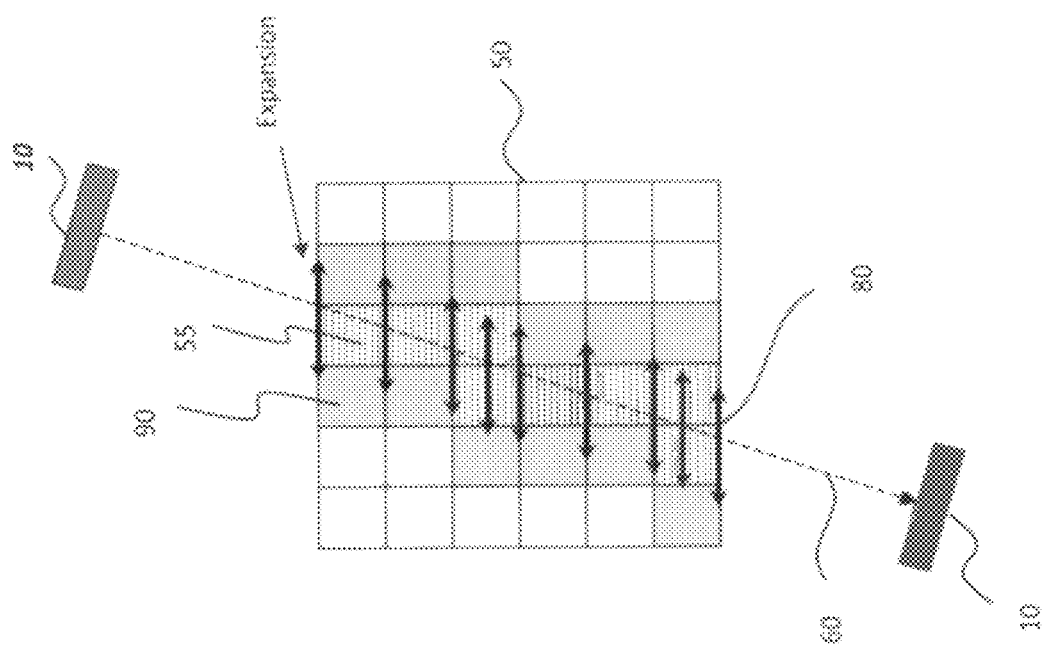
FIG. 4 illustrates the central-ray-filling (CRF) algorithm.

FIG. 4 illustrates the CRF algorithm in a 2D case. The CRF algorithm applies an expansion 80 (marked by arrows) in the horizontal direction. Thus, for any intersected voxel 55 along the central ray 60, the CRF algorithm collects its neighbor voxels 90 within a predetermined horizontal range (determined by a ratio of crystal 10 and voxel size, and the tilted angle of lines connecting endpoints of the two crystals). Accordingly, any intersected voxels 55 inside TOR 30 may be obtained with one ray-tracing procedure. Finally, a sorting and duplication-deleting process is applied to delete all duplicate voxels.

Selecting the Proper Expansion Direction

Figure 5B:
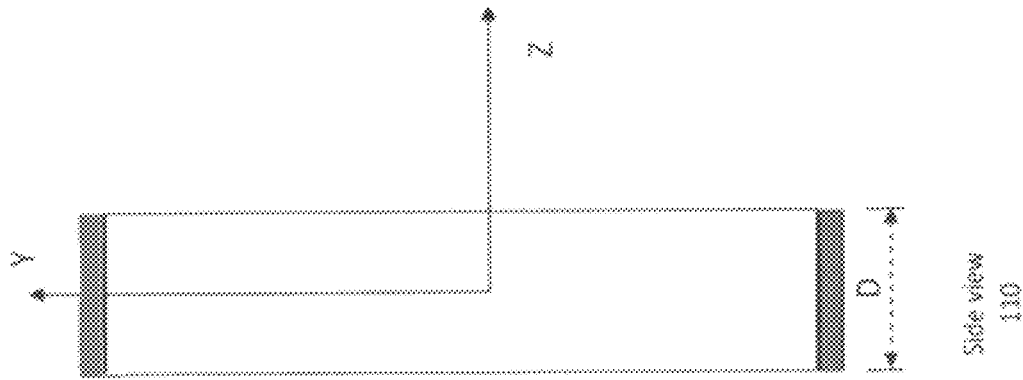
FIGS. 5A and 5B show a front view and side view of a Positron Emission Tomography (PET) system, respectively.
Figure 5A:
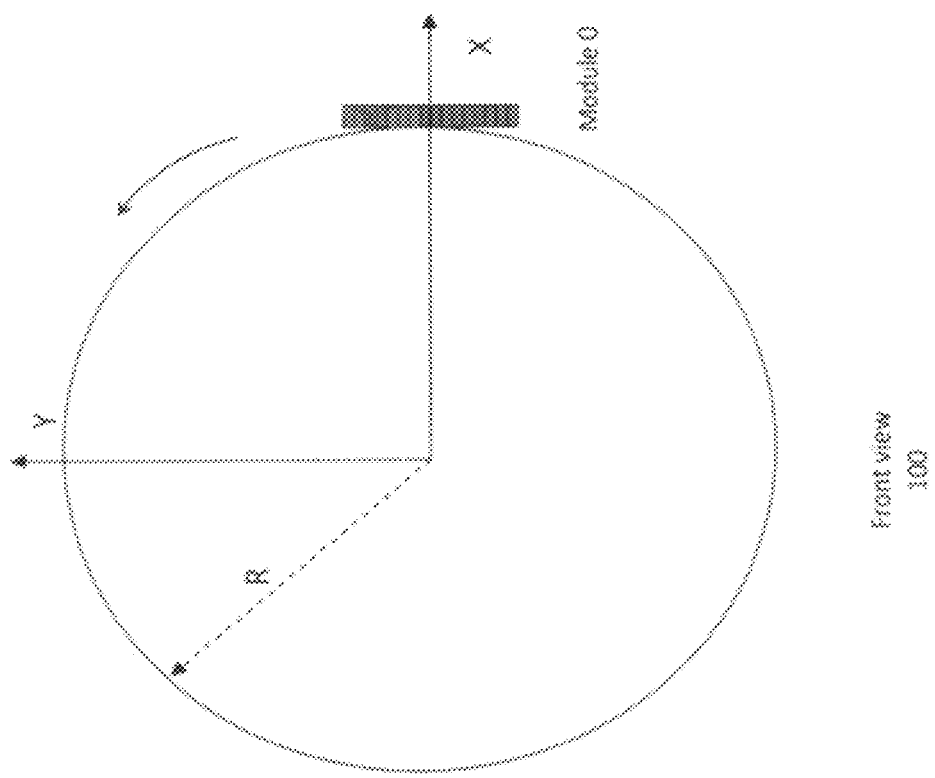

FIG. 5A shows a front view 100 of a PET system and FIG. 5B shows a side view 110 of the PET system. In the PET system, the diameter of the PET detector ring (2R) may be larger than the axial length (D) of the detector ring, as is shown in FIG. 5B. For example, a typical PET system design may have 2R=900 mm and D=195 mm. A pairing algorithm may require a certain angle difference between two single events, for example, a 90 degree difference in a typical system design. The aforementioned geometric information and pairing requirements are used in selecting the expansion directions applied in the CRF algorithm.

Figure 6A:
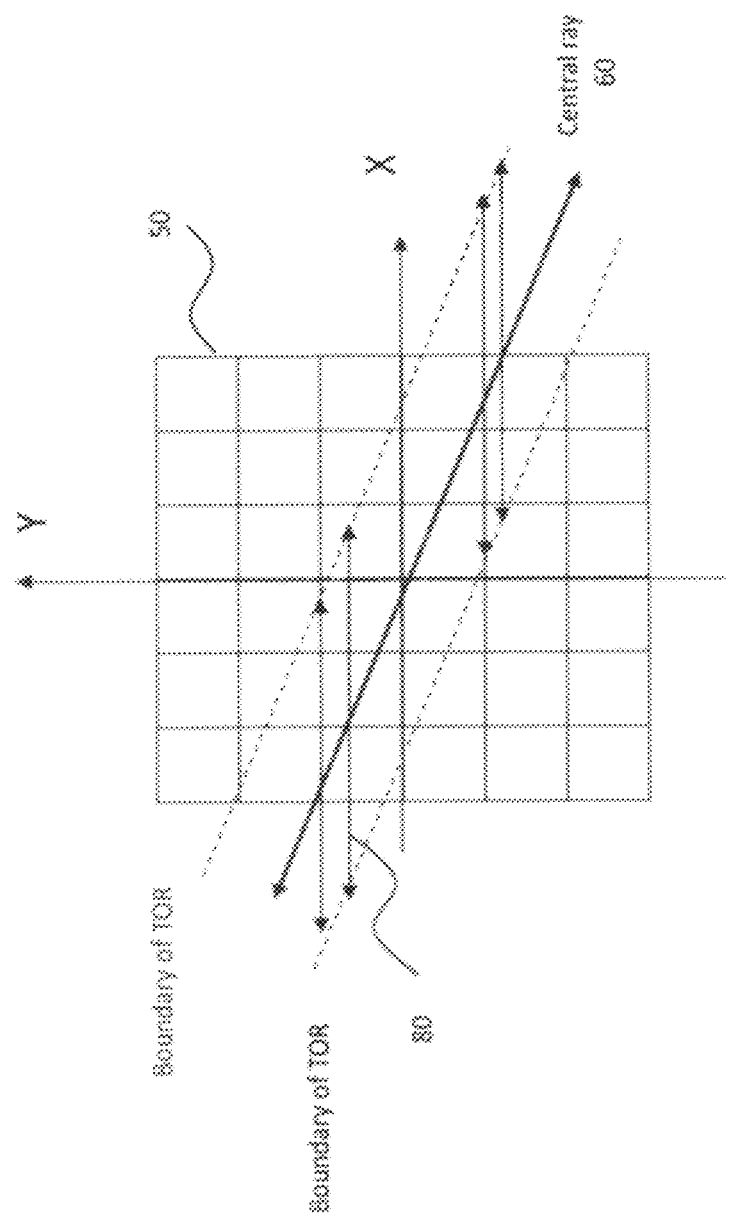
FIGS. 6A-6C show embodiments of selecting expansion directions.

A proper expansion direction in the CRF algorithm is selected for a couple of reasons. As shown in FIG. 6A, for a central ray 60 that is parallel, or substantially parallel, to the X-axis, an improper direction (i.e., X-direction in this case) introduces a very large or infinite value for the expansion distance. This may cause the overflow of voxel index or an algorithm crash. Furthermore, an improper direction may negatively affect the voxel-skipping process discussed below.

Figure 6C:
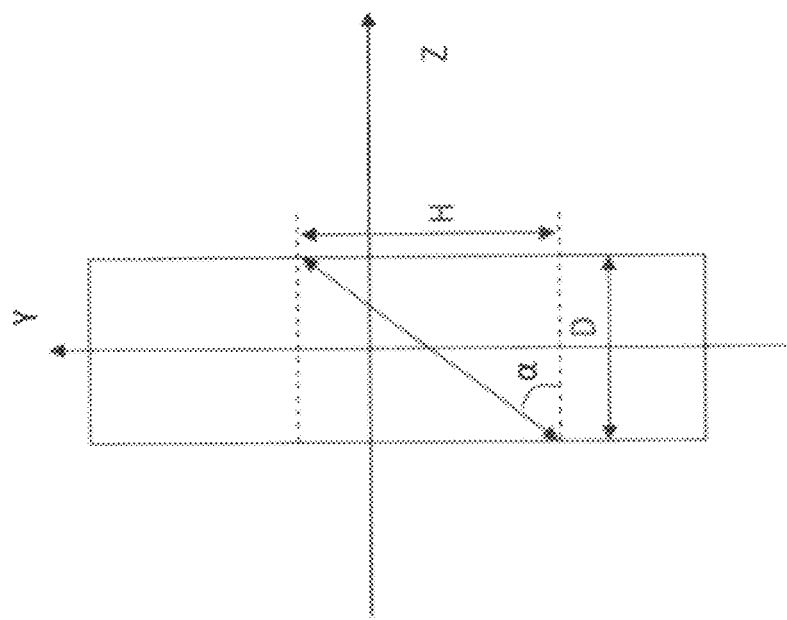
Figure 6B:
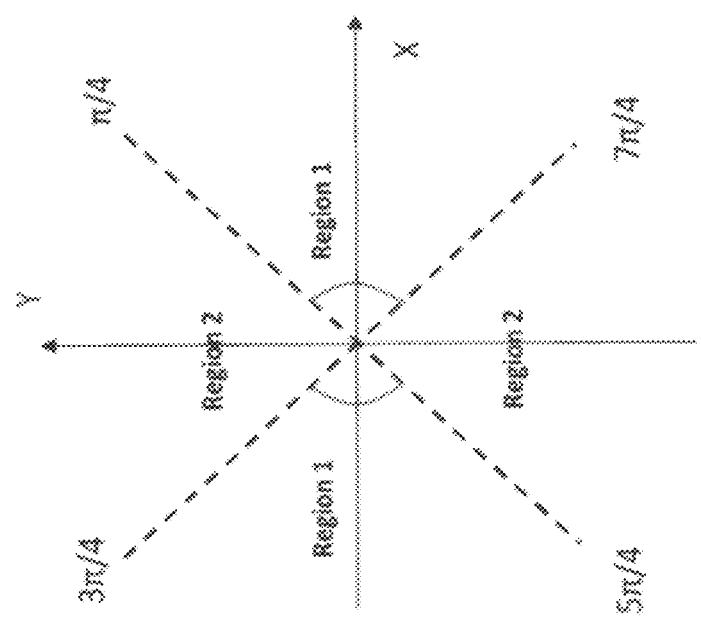
Figure 7A:
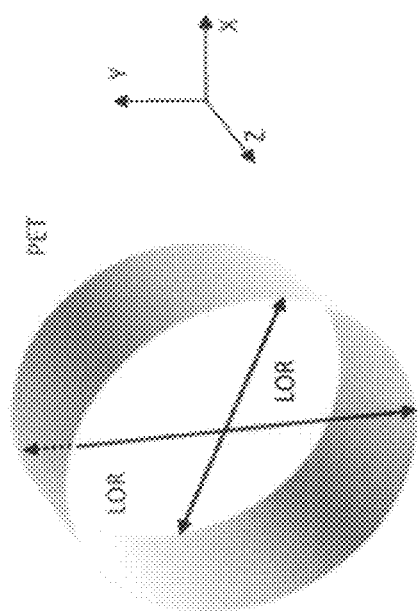
FIGS. 7A-7C show embodiments of selecting projection planes and expansion directions.
Figure 7B:
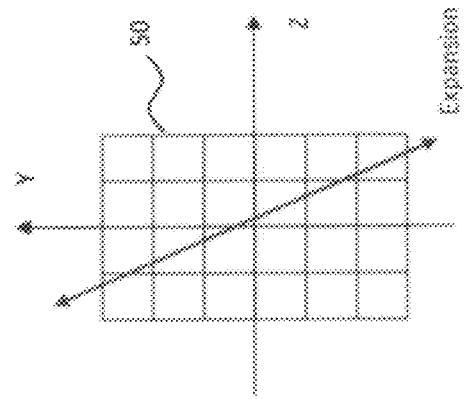
Figure 7B:
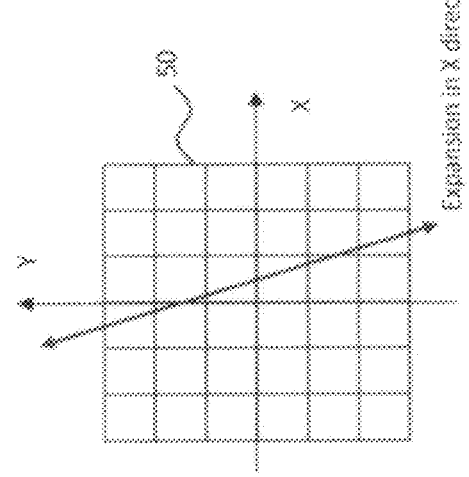
Figure 7C:
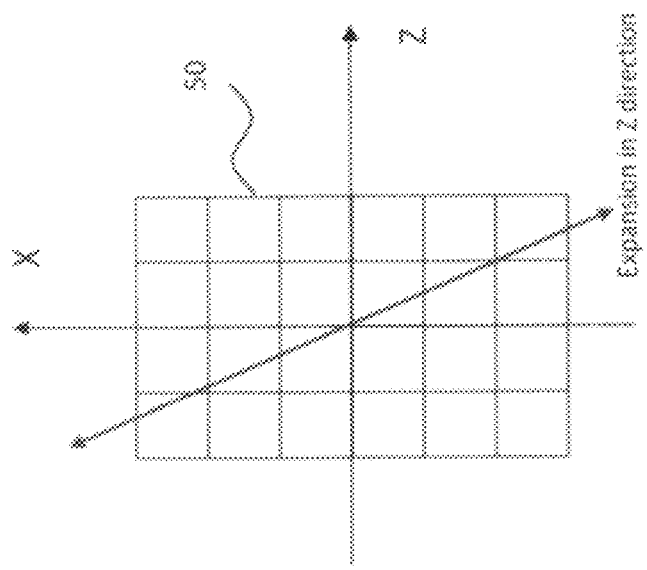
Figure 7C:
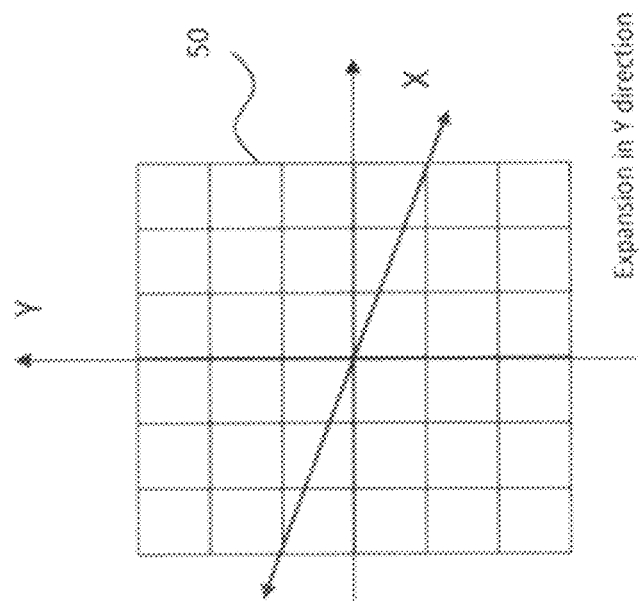

Thus, a proposed expansion direction is selected based on the geometric properties of the PET system. Accordingly, based on the geometric properties, different expansion directions for different Cartesian planes may be selected. For example, for the X-Y plane, the reconstruction space 50 is divided into two regions according to the angle between the central ray and +X axis: Region 1 for Y-expansion and Region 2 for X-expansion, as is shown in FIG. 6B. For the Y-Z or X-Z plane, similar divisions can be applied according to the angle between the central ray and +Z axis. However, only Region 2 is possible in most PET systems (i.e., the PET system corresponding to FIG. 6C), because the angle α is always in Region 2 since H is always greater than D. Therefore, the TOR-tilted angle dictates projection planes and expansion directions, as is shown in FIG. 7A. For example, FIG. 7B shows an expansion in the X direction and an expansion in the Z direction, and FIG. 7C shows an expansion in the Y direction and an expansion in the Z direction.

Calculating the Expansion Distance

Figure 8A:
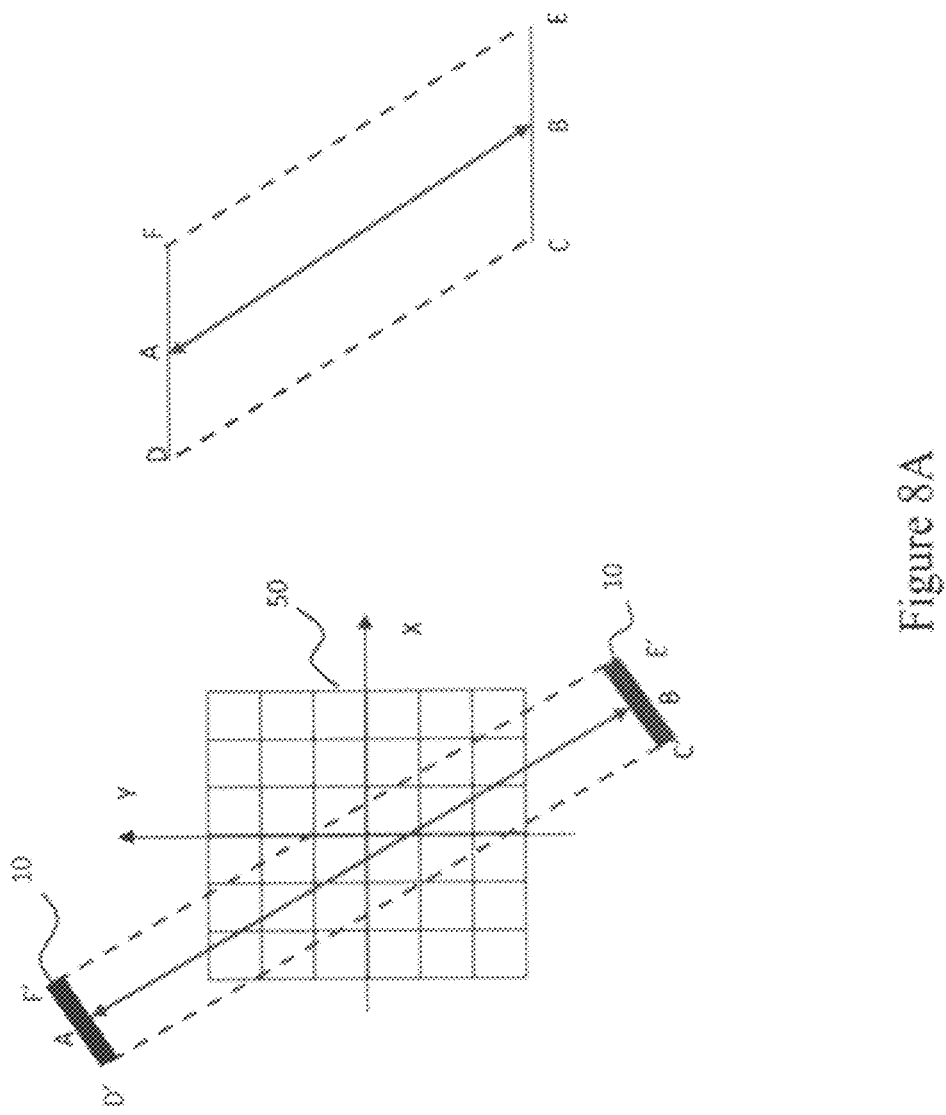
FIGS. 8A-8C show examples of calculations of expansion distance.
Figure 8B:
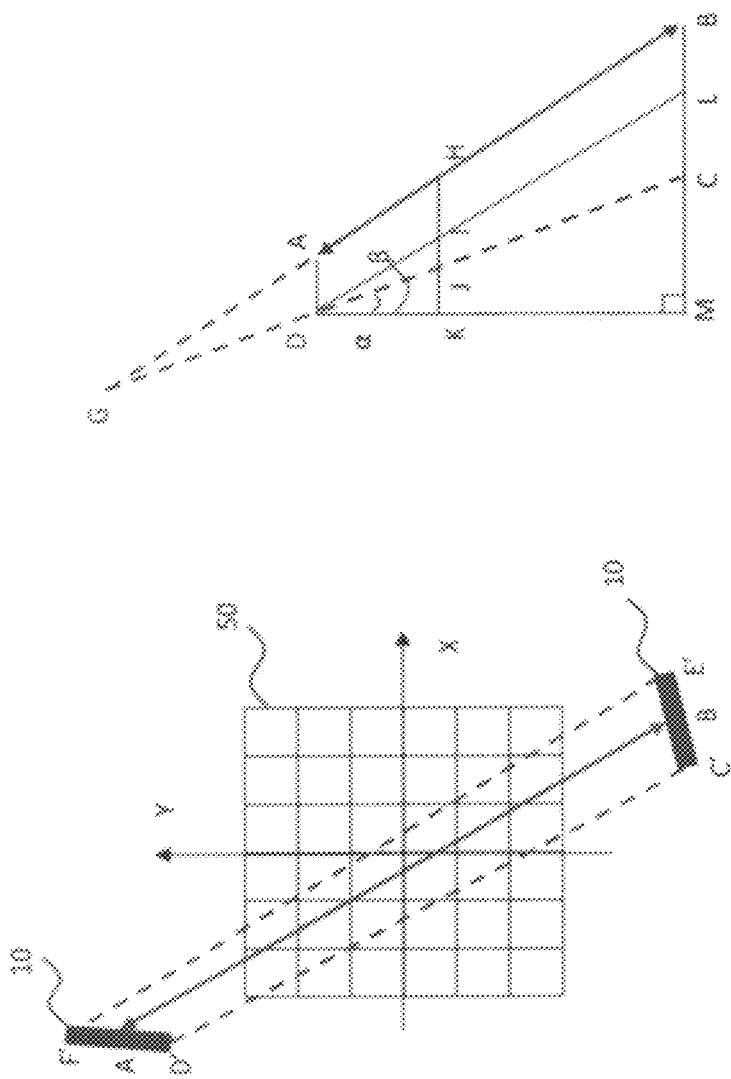
Figure 8C:
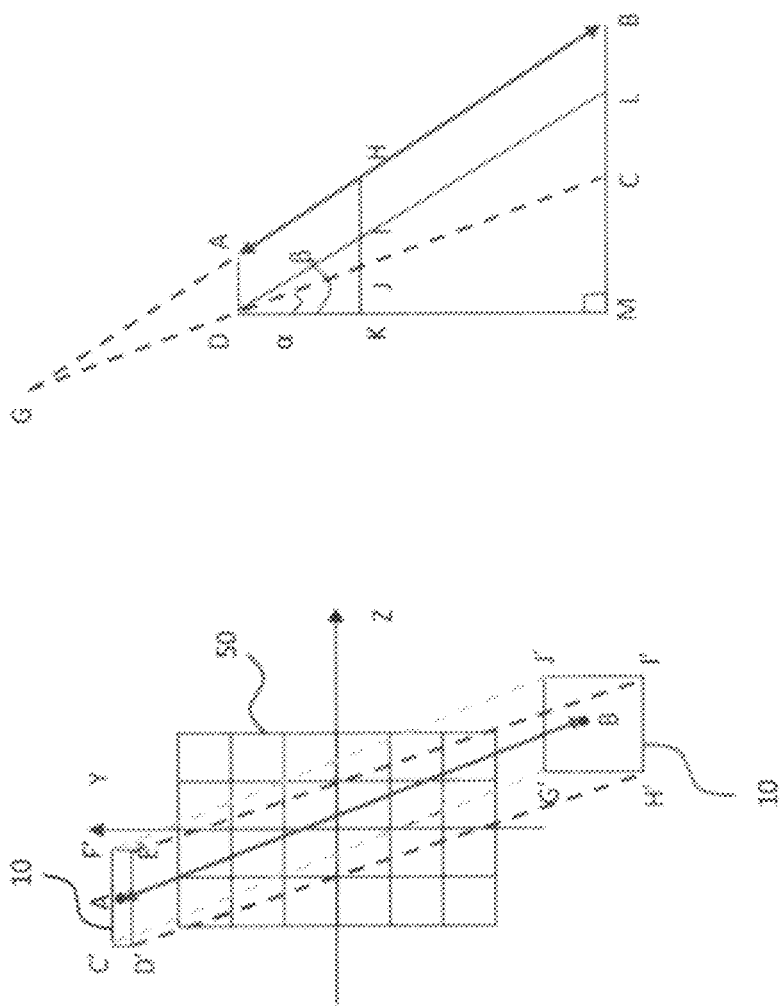

FIGS. 8A-8C illustrate calculations of the expansion 80 distance in three cases: FIG. 8A shows a parallel case in the X-Y plane; FIG. 8B shows a non-parallel case in the X-Y plane; and FIG. 8C shows a non-parallel case in the Y-Z plane. The expansion 80 distance may be easily calculated if two surfaces of TOR 30 are parallel to each other. For example in FIG. 8A, the expansion 80 distance is equal to half the size (i.e., width) of the crystal 10 projected to the X-axis (i.e., $\overline{AD} = \overline{AF} = \overline{BC} = \overline{BE}$).

However, if the two surfaces are not parallel, the expansion 80 distance has to be divided into a left and a right distance, which varies with voxel positions. As is shown in FIG. 8B, the ray AB is parallel to neither C'D' or E'F', and at the same time, C'D' and E'F' are also not parallel to each other. The expansion 80 distance in the left region ABC'D' relative to the central ray is not the same as that in the right region ABE'F' relative to the central ray. The following example (related to the left region ABC 'D') illustrates the steps of the calculations of the spatial variant distances.

First, a straight line AD (or BC), through the crystal 10 center A (or B) and parallel to X-axis, is plotted. Next, for any intersected point H, a straight line HJ parallel to X-axis is plotted. Then, two auxiliary lines to assist calculations are plotted. One auxiliary line is DM, which is perpendicular to BC, and another auxiliary line is DL, which is parallel to AB. Finally, the expansion 80 distance at the point H, $\overline{HI}$, is calculated as follows:

$$\overline{HJ} = \overline{HI} + \overline{IJ} = \overline{HI} + \overline{IK} - \overline{JK}$$

$$= \overline{HI} + \overline{DK}\tan\beta - \overline{DK}\tan\alpha$$

$$= \overline{HI} + \overline{DK}\left(\frac{\overline{LM}}{\overline{DM}} - \frac{\overline{CM}}{\overline{DM}}\right)$$

$$= \overline{HI} + \overline{DK}\frac{\overline{LC}}{\overline{DM}}$$

$$= \overline{HI} + \frac{\overline{DK}(\overline{BC} - \overline{BL})}{\overline{DM}}$$

$$= \overline{AD} + \frac{\overline{DK}(\overline{BC} - \overline{AD})}{\overline{DM}}$$

Similar calculations can be applied for the right region (ABE'F').

In the Y-Z or X-Z plane, the projection of the crystal 10 surface is not a line, but a rectangle in most cases. As is shown in FIG. 8C, for a certain TOR 30, the two rectangles (i.e., C'F'E'D' and G'J'I'H') may have different sizes in the Y direction. Therefore, the four lines connecting eight corners of two crystals 10 are not all parallel to each other, but D'H' is parallel to E'I' and C'G' is parallel to F'J' (D'H'∥E'I' and C'G'∥F'J'). Accordingly, when considering the extent of the expansion 80, the edges of TOR 30 should select the lines located most outside (i.e., farthest from each other), such as D'H' and F'J' in this example.

Other steps in the calculation of the expansion 80 distance are similar to the case in the X-Y plane.

In summary, the expansion distance can be calculated in three cases: 1) when lines connecting endpoints of the two crystals are parallel to each other in a X-Y plane, the expansion distance is equal to half a size of a length of the two crystals projected onto a coordinate axis of the PET apparatus; 2) when lines connecting endpoints of the two crystals are not parallel to each other in a X-Y plane, the method calculates a left (or upper) expansion distance and a right (or lower) expansion distance, the left (or upper) expansion distance corresponding to a left (or upper) side of the two crystals projected onto a coordinate axis of the PET apparatus and being different from the right (or lower) expansion distance corresponding to a right (or lower) side of the two crystals projected onto the X-axis (or Y-axis); and 3) when a first line connecting two endpoints of a first side of the two crystals is not parallel to a second line connecting two endpoints of a second side of the two crystals in a Y-Z/X-Z plane (the first line and the second line being located farthest from each other), the method calculates a first Z expansion distance in a negative Z direction along the Z-axis and a second Z expansion distance in a positive Z direction along the Z-axis.

Skipping Unnecessary Intersections

Figures 9A, 9B:
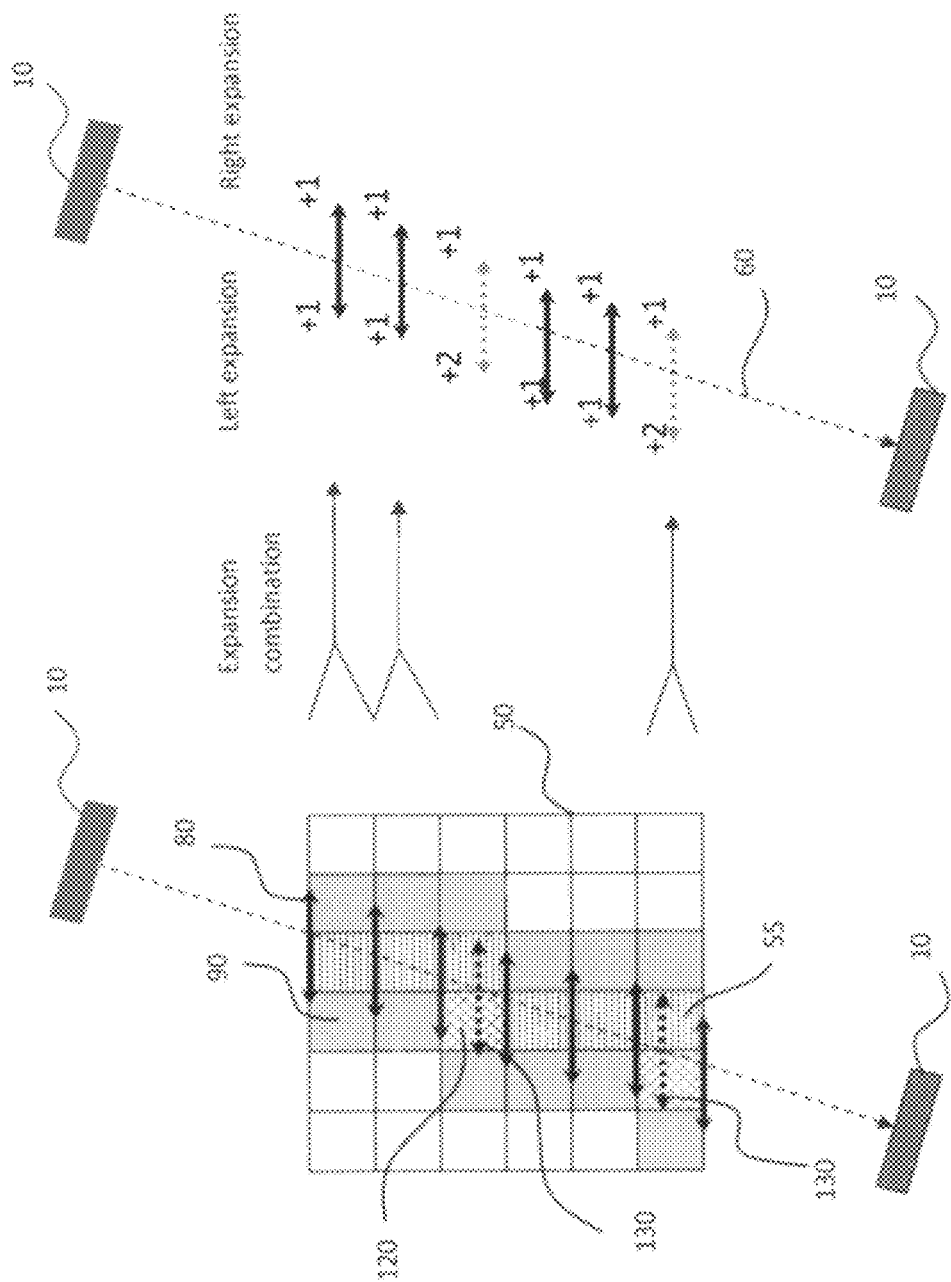
FIGS. 9A and 9B illustrate a skipping process in the CRF algorithm.

If the aforementioned expansion 80 is applied to every intersection of the central ray 60 and the reconstruction space 50, many intersected voxels 55 are calculated more than once. This observation can be explained through an example in FIGS. 9A and 9B, in which the expansion 80 is applied in the X direction. In the example of FIG. 9A, one expansion with a certain length is applied to each intersected, and therefore two or more expansions (indicated by arrows) are applied to the intersected voxels 55. For any intersection on which three (3) or more expansions are applied, duplications may be produced, such as duplicate voxels 120 in FIG. 9A.

The expansions are usually calculated in the unit of voxel, and therefore the boundaries of the voxels are integers which can be used in the skipping process. For example, for expansions in the X and Z directions, intersections may be skipped if any intersection has (1) an x coordinate that equals an integer, but a y coordinate that does not equal an integer, or (2) a z coordinate that equals an integer, but a y coordinate that does not equal an integer. For expansions in the Y and Z directions, intersections may be skipped if any intersection has (1) a y coordinate that equals an integer, but an x coordinate that does not equal an integer, or (2) a z coordinate that equals an integer, but an x coordinate that does not equal an integer.

At the same time, one-voxel-long expansion 80 distance is added to the next intersection's expansion, either to the left or the right part depending on the direction of the central ray 60. For example, in FIG. 9B, a distance is added to the left part. Dashed arrows 130 in FIG. 9A are skipped. For each two neighboring expansions, one combined expansion is produced and the left or right part of the expansion is the maximum of corresponding two expansions, as is shown in FIG. 9B. For example, for two neighboring expansions E1 and E2, the combined expansion E12 is calculated as follows:

$$E_{12}\_\text{left\_part} = \text{MAX}(E_1\_\text{left\_part}, E_2\_\text{left\_part}), \text{ and}$$

$$E_{12}\_\text{right\_part} = \text{MAX}(E_1\_\text{right\_part}, E_2\_\text{right\_part}).$$

Duplication Deletion

Figure 10B:
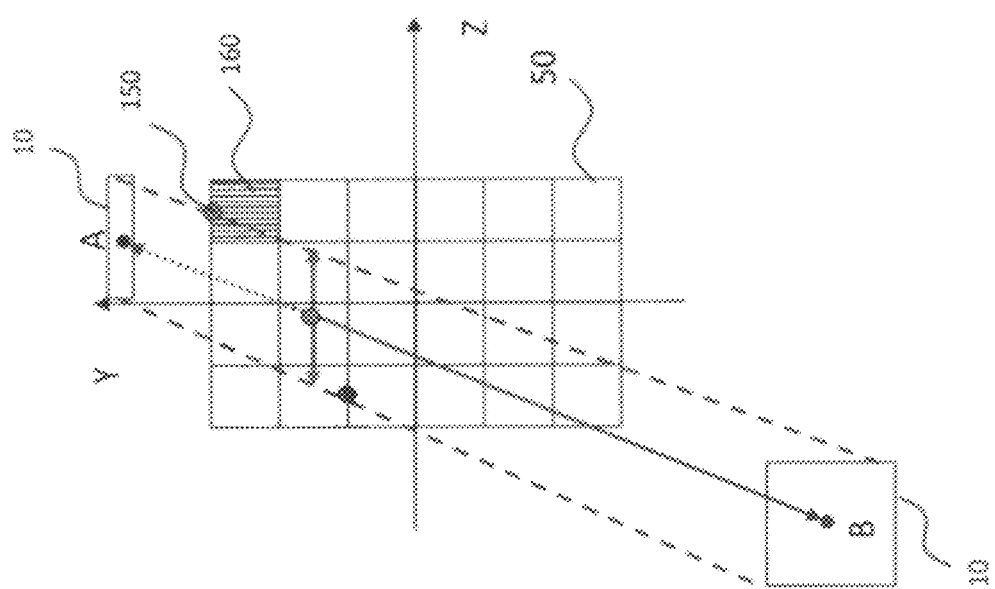
FIGS. 10A and 10B show embodiments of processes for the first or last intersection of the central ray and reconstruction space.
Figure 10A:
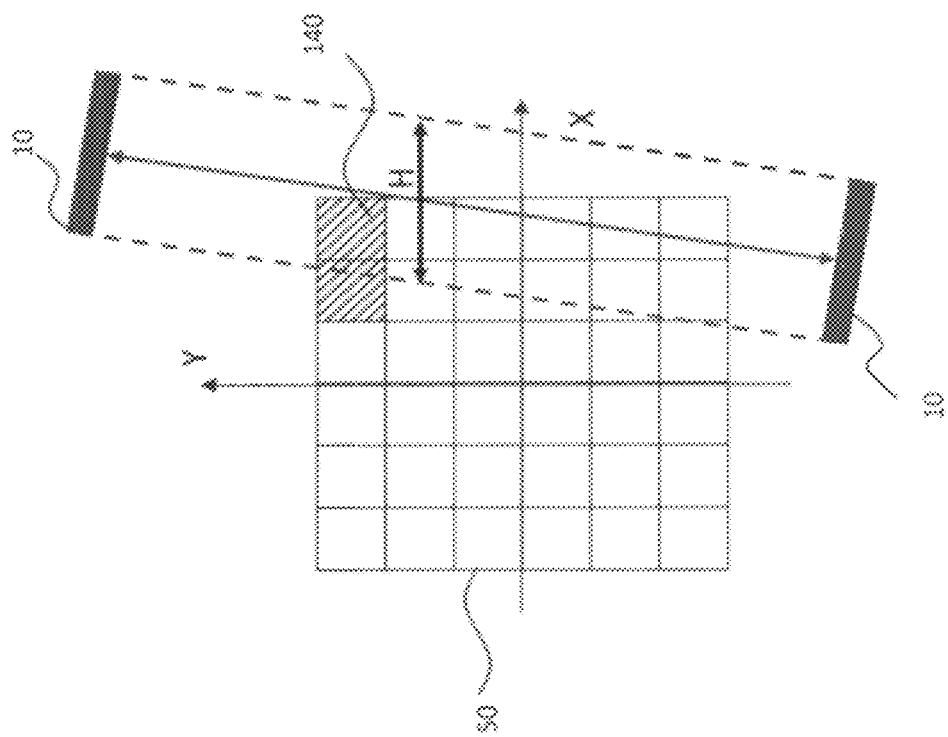

Even if unnecessary intersections are skipped to reduce duplications of intersected voxels, as discussed above, duplicated voxels may still exist. For example, numerical errors, especially from the limited precision of floating numbers, may cause duplicated voxels. Further, special processing for the first or last intersection of the central ray 60 in the X-Y plane may also cause duplicated voxels. For example, in FIG. 10A, the horizontal expansion of the last intersection H cannot include the voxels 140 above it. In this case, an additional vertical expansion is needed to include the voxels 140. Therefore, the above-discussed intersection-skip may not be applied to the first or last intersection which may introduce duplicate voxels.

Special processing for the first or last intersection of the central ray 60 in the X-Z or Y-Z plane may also cause duplicated voxels. As discussed above, four (4) rays connecting eight (8) corners of two (2) crystals 10 are not parallel to each other, and they may not be in the same plane. For example in FIG. 10B, three (3) rays are not in the same plane, and their first intersections (indicated by dots 150) are not on the same level. In this case, even if an additional vertical expansion is applied, the voxel 160 is still missed. To solve this problem, the minimum and maximum Z coordinates of the crystal 10A are calculated and used in the first (or last) expansion along the Z direction. This process, however, may also introduce duplicated voxels since the above-discussed intersection-skip may not be applied.

However, the duplication rate of the CRF algorithm is much lower than the ray-tracing algorithm (i.e., 0.52% vs. 35%), when the crystal 10 and voxel have the same size. In order to delete those duplications, a quick sort process may be used.

In summary, a ray-tracing calculation is used to calculate the central ray of a TOR, and to find the intersected voxels along the central ray. Next, an expanding range is calculated based on a size ratio of crystal and voxel and tilted angles of lines connecting endpoints of the two crystals in both X-Y and Y-Z/X-Z plane. Further, neighboring voxels within the expanding range from the intersected voxels are searched and collected in both X-Y and Y-Z/X-Z plane. Finally, duplicated voxels are deleted by applying the aforementioned sorting and duplication-deleting process. The above-identified process is then applied to calculate intersections of the next TOR, until all. TORs have been calculated.

Figure 11:
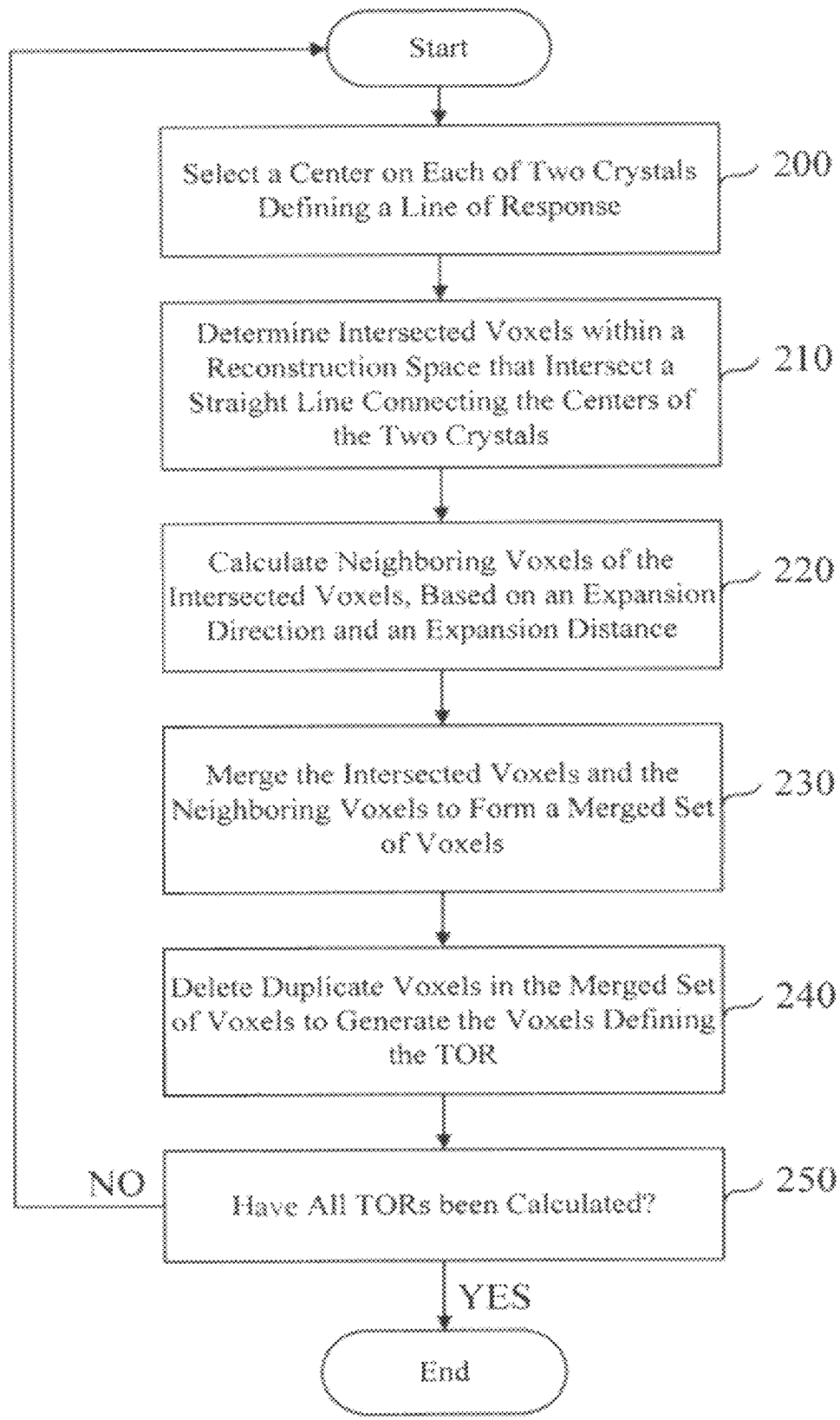
FIG. 11 illustrates a flow chart of a method of the present disclosure.

FIG. 11 illustrates a method for calculating voxels defining a TOR 30 within a reconstruction space of a PET apparatus according to one embodiment. In step 200, one central point is selected on a crystal 10 and a second point is selected in another crystal 10, the crystals 10 being located in a PET ring 20, the selected points defining a Line-of-Response (LOR). Next, in step 210, intersected voxels 55 within a reconstruction space that intersect a straight line connecting the points are determined. Next, in step 220, neighboring voxels 90 of the intersected voxels 55 are calculated based on an expansion direction and an expansion distance. In step 230, the intersected voxels 55 and the neighboring voxels 90 are merged to form a merged set of voxels. In step 240, the duplicated voxels in the merged set of voxels are deleted to generate the voxels defining the TOR 30. Next, in step 250, the method determines whether all TORs in the PET apparatus have been calculated. If all TORs have been calculated (YES), the process ends. However, if all TORs have not been calculated (NO), the process starts again in step 200.

Speed Comparison

Figure 12:
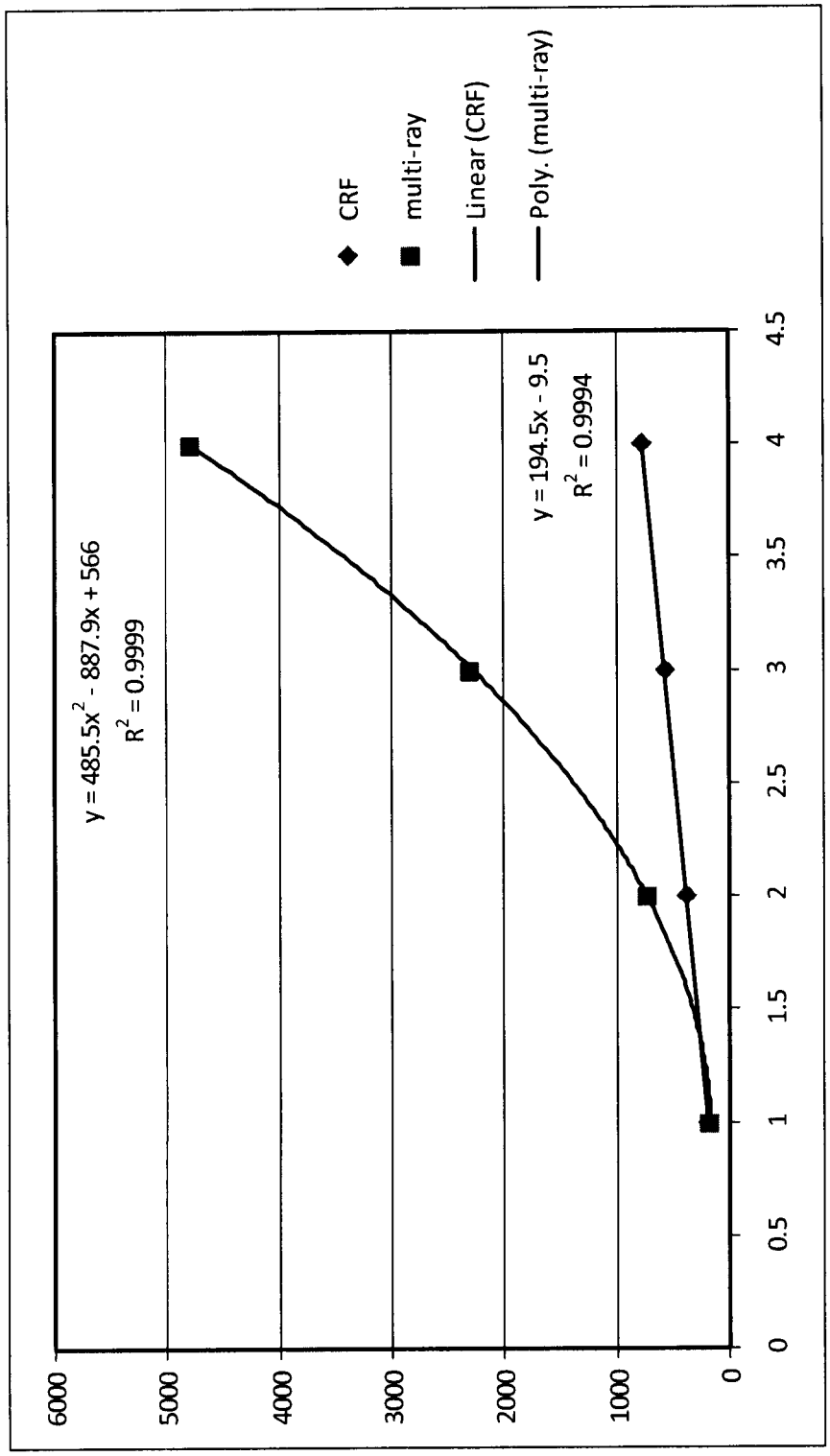
FIG. 12 shows an execution time comparison for the CRF algorithm and the ray-tracing algorithm.

Using a PET system with a design of 48 rings and 40 modules, the calculation speeds were compared for the CRF algorithm and the ray-tracing algorithm with a different size ratio between crystal and voxel. The execution time for both algorithms is listed in Table 1 and plotted in FIG. 12. The CRF algorithm has slightly worse performance for ratio=1, but much better performance for other ratios. From the fitting curves, the time complexity is $O(n)$ and $O(n^2)$ for the CRF and ray-tracing algorithms, respectively (where n=ratio=crystal size/voxel size).

TABLE 1

The execution time for the CRF and ray-tracing algorithm.

| Ratio = crystal/voxel | CRF (s) | Multi-ray-tracing (s) | Multi-ray-tracing/CRF |
|---|---|---|---|
| 1 | 185 | 170 | 0.92 |
| 2 | 384 | 713 | 1.9 |
| 3 | 565 | 2291 | 4.1 |
| 4 | 773 | 4776 | 6.2 |

Thus, the CRF algorithm reduces computational time without losing the intersected voxels. An advantage of the CRF algorithm may be seen as the ratio of the crystal and voxel size increases. Furthermore, since finding intersections is a process applied in forward and backward projections, the embodiments of the present disclosure may also be applied to other imaging techniques such as, but not limited to, X-ray Computed Tomography (CT) and Single Photon Emission Computed Tomography (SPECT).

Figure 13:
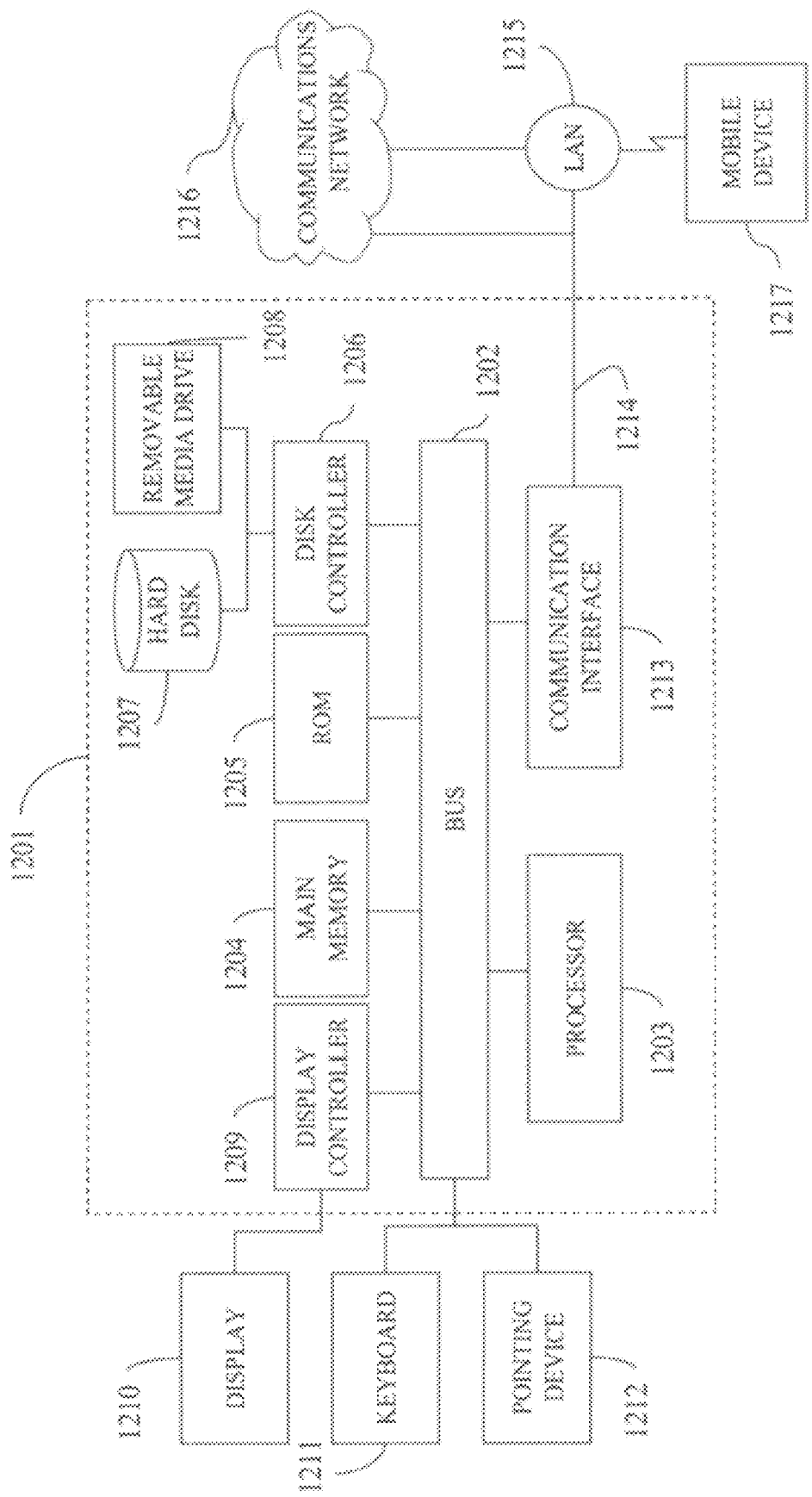
FIG. 13 illustrates a computer system upon which an embodiment of the present disclosure may be implemented.

Various components of the PET system described above can be implemented using a computer system or programmable logic. FIG. 13 illustrates a computer system 1201 upon which embodiments of the present disclosure may be implemented. The computer system 1201 may include, for example, the different processing units (i.e., a selecting unit, a determining unit, a calculating unit, a merging unit, and a deleting unit) of a reconstruction device, which performs the above-described process.

The computer system 1201 includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as the touch panel display 101 or a liquid crystal display (LCD), for displaying information to a computer user. The computer system includes input devices, such as a keyboard 1211 and a pointing device 1212, for interacting with a computer user and providing information to the processor 1203. The pointing device 1212, for example, may be a mouse, a trackball, a finger for a touch screen sensor, or a pointing stick for communicating direction information and command selections to the processor 1203 and for controlling cursor movement on the display 1210.

The computer system 1201 performs a portion or all of the processing steps of the present disclosure in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 1201, for driving a device or devices for implementing the invention, and for enabling the computer system 1201 to interact with a human user. Such software may include, but is not limited to, device drivers, operating systems, and applications software. Such computer readable media further includes the computer program product of the present disclosure for performing all or a portion (if processing is distributed) of the processing performed in implementing the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1203 for execution. A computer readable medium may take many forms, including but not limited to, non-volatile media or volatile media. Non-volatile media includes, for example, optical, magnetic disks, and magneto-optical disks, such as the hard disk 1207 or the removable media drive 1208. Volatile media includes dynamic memory, such as the main memory 1204. Transmission media, on the contrary, includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1201 may receive the data on the telephone line and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an integrated services digital network (ISDN) card. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

While certain embodiments have been described, these embodiments have been presented by way of example only, and are not intended to limit the scope of the inventions. Indeed the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method for calculating voxels defining a tube-of-response (TOR) within a reconstruction space of a Positron Emission Tomography (PET) apparatus having a plurality of crystals, the voxels within the reconstruction space having a predetermined size, the method comprising:
    selecting a center on each of two crystals defining a line of response;
    determining intersected voxels within the reconstruction space that intersect a straight line connecting the centers of the two crystals;
    calculating neighboring voxels for each intersected voxel of the intersected voxels, based on an expansion direction and an expansion distance, the expansion distance being determined for each intersected voxel based on a position of the intersected voxel along the straight line, when lines connecting endpoints of the two crystals are not parallel to each other;
    merging the intersected voxels and the neighboring voxels to form a merged set of voxels; and
    deleting duplicate voxels in the merged set of voxels to generate the voxels defining the TOR.

2. The method of claim 1, further comprising:
    determining the expansion direction based on a location of the two crystals and geometric properties of the PET apparatus.

3. The method of claim 1, further comprising:
    determining the expansion distance based on a size of the two crystals, the predetermined size of the voxels within the reconstruction space, and a tilted angle of the lines connecting the endpoints of the two crystals.

4. The method of claim 1, wherein the step of calculating the neighboring voxels further comprises:
    calculating the expansion distance, the expansion distance being equal to half a size of a length of the two crystals projected onto a coordinate axis of the PET apparatus, when the lines connecting the endpoints of the two crystals are parallel to each other.

5. The method of claim 1, wherein the step of calculating the neighboring voxels further comprises:
    calculating a left expansion distance and a right expansion distance, the left expansion distance corresponding to a left side of the two crystals projected onto an X-axis of the PET apparatus and being different from the right expansion distance corresponding to a right side of the two crystals projected onto the X-axis, when the lines connecting the endpoints of the two crystals are not parallel to each other.

6. The method of claim 1, wherein the step of calculating the neighboring voxels further comprises:
    calculating an upper expansion distance and a lower expansion distance, the upper expansion distance corresponding to an upper side of the two crystals projected onto a Y-axis of the PET apparatus and being different from the lower expansion distance corresponding to a lower side of the two crystals projected onto the Y-axis, when the lines connecting the endpoints of the two crystals are not parallel to each other.

7. The method of claim 1, wherein the step of calculating the neighboring voxels further comprises:
    calculating a first Z expansion distance in a negative Z direction along a Z-axis and a second Z expansion distance in a positive Z direction along the Z-axis, based on a distance between a first line connecting two endpoints of a first side of the two crystals projected onto the Z-axis of the PET apparatus, and a second line connecting two endpoints of a second side of the two crystals projected onto the Z-axis, the first line and the second line being located farthest from each other.

8. The method of claim 1, wherein
    the step of calculating the neighboring voxels is performed in an X-Y plane and in a Y-Z or X-Z plane of the PET apparatus.

9. The method of claim 1, wherein
    the determining step includes skipping intersections of the intersected voxels based on boundaries of the intersected voxels in an X-Y plane and in a Y-Z or X-Z plane of the PET apparatus.

10. A reconstruction device for calculating voxels defining a tube-of-response (TOR) within a reconstruction space of a Positron Emission Tomography (PET) apparatus having a plurality of crystals, the voxels within the reconstruction space having a predetermined size, the reconstruction device comprising:
 a processing circuit configured to
  select a center on each of two crystals defining a line of response;
  determine intersected voxels within the reconstruction space that intersect a straight line connecting the centers of the two crystals;
  calculate neighboring voxels for each intersected voxel of the intersected voxels, based on an expansion direction and an expansion distance, the expansion distance being determined for each intersected voxel based on a position of the intersected voxel along the straight line, when lines connecting endpoints of the two crystals are not parallel to each other;
  merge the intersected voxels and the neighboring voxels to form a merged set of voxels; and
  delete duplicate voxels in the merged set of voxels to generate the voxels defining the TOR.

11. The reconstruction device of claim 10, wherein
the processing circuit is further configured to determine the expansion direction based on a location of the two crystals and geometric properties of the PET apparatus.

12. The reconstruction device of claim 10, wherein
the processing circuit is further configured to determine the expansion distance based on a size of the two crystals, the predetermined size of the voxels within the reconstruction space, and a tilted angle of the lines connecting the endpoints of the two crystals.

13. The reconstruction device of claim 10, wherein
the processing circuit is further configured to calculate the expansion distance, the expansion distance being equal to half a size of a length of the two crystals projected onto a coordinate axis of the PET apparatus, when the lines connecting the endpoints of the two crystals are parallel to each other.

14. The reconstruction device of claim 10, wherein
the processing circuit is further configured to calculate a left expansion distance and a right expansion distance, the left expansion distance corresponding to a left side of the two crystals projected onto an X-axis of the PET apparatus and being different from the right expansion distance corresponding to a right side of the two crystals projected onto the X-axis, when the lines connecting the endpoints of the two crystals are not parallel to each other.

15. The reconstruction device of claim 10, wherein
the processing circuit is further configured to calculate an upper expansion distance and a lower expansion distance, the upper expansion distance corresponding to an upper side of the two crystals projected onto an Y-axis of the PET apparatus and being different from the lower expansion distance corresponding to a lower side of the two crystals projected onto the Y-axis, when the lines connecting the endpoints of the two crystals are not parallel to each other.

16. The reconstruction device of claim 10, wherein
the processing circuit is further configured to calculate a first Z expansion distance in a negative Z direction along a Z-axis and a second Z expansion distance in a positive Z direction along the Z-axis, based on a distance between a first line connecting two endpoints of a first side of the two crystals projected onto the Z-axis of the PET apparatus, and a second line connecting two endpoints of a second side of the two crystals projected onto the Z-axis, the first line and the second line being located farthest from each other.

17. The reconstruction device of claim 10, wherein
the processing circuit is configured to calculate the neighboring voxels in an X-Y plane and in a Y-Z or X-Z plane of the PET apparatus.

18. The reconstruction device of claim 10, wherein
the processing circuit is further configured to skip intersections of the intersected voxels based on boundaries of the intersected voxels in an X-Y plane and in a Y-Z or X-Z plane of the PET apparatus.

19. The method of claim 1, wherein the step of calculating the neighboring voxels further comprises:
 judging, based on tilted angles of the lines connecting the endpoints of the two crystals, whether the lines are parallel to each other.

20. The reconstruction device of claim 10, wherein
the processing circuit is further configured to, based on tilted angles of the lines connecting the endpoints of the two crystals, judge whether the lines are parallel to each other.

* * * * *